Jan. 20, 1959 R. R. COLBURN 2,869,304
COMBINED TRACTOR AND POWER MOWER
Filed March 15, 1956 2 Sheets-Sheet 1

INVENTOR.
Richard R. Colburn
BY
Thos. E. Scofield
ATTORNEY.

Jan. 20, 1959 R. R. COLBURN 2,869,304
COMBINED TRACTOR AND POWER MOWER
Filed March 15, 1956 2 Sheets-Sheet 2

INVENTOR.
Richard R. Colburn
BY Thos. E. Scofield
ATTORNEY.

United States Patent Office 2,869,304
Patented Jan. 20, 1959

2,869,304

COMBINED TRACTOR AND POWER MOWER

Richard R. Colburn, Johnson County, Kans.

Application March 15, 1956, Serial No. 571,676

10 Claims. (Cl. 56—25.4)

This invention relates to machines for cutting or mowing grass, underbrush and the like and refers more particularly to a tractor and mower combination in which the mowing assembly is supported beneath the tractor and is of the horizontal blade or "spinner" type.

This application is an improvement, in certain respects, over my copending application Serial No. 398,578, filed December 16, 1953, now Patent No. 2,801,510, issued August 6, 1957.

A primary object of the invention is to provide an improved power mower unit of the character described in which the power unit resembles a conventional tractor, the cutting elements being suspended beneath the tractor and being so arranged as to extend laterally to each side of the tractor beyond the tractor wheels. It is a feature of the invention that the spinner blades are slung beneath the chassis of the tractor intermediate the front and rear wheels and are so positioned with respect to the front and rear axles that the leading edge of the mower assembly is located as closely as possible to the front wheel axis of the tractor. The primary advantage in such an arrangement is that the close proximity of the leading edge of the mower to the axis of the front wheels provides a means of avoiding "scalping" of crowns and ridges since it insures that the mower will be lifted through substantially the same displacement as the wheels when the latter pass over the crown and therefore that the mower will be at all times maintained at an even spacing from the ground.

Another important object of the invention is to provide a mowing unit of the character described in which the rotary spinner blades are carried within a housing which is so connected with the tractor unit that it is caused to rise and fall and tilt from side to side independently of the tractor under the influence of changing ground contours thereby to maintain an even cut. An important feature of the invention in this respect resides in the manner of supporting the mower housing beneath the tractor unit in order to accomplish the above results, and also in the provision of a suitable flexible drive connection from the power unit on the tractor to the rotary blades which will maintain the blades in operation despite changes in the inclination of the housing relative the tractor.

A further object of the invention is to provide an improved mower of the character described which carries a plurality of rotary blades so arranged with respect to one another and to the tractor unit as to present a continuous cutting edge through the full width of the mower and in which the blades are driven simultaneously from a single common drive shaft. A feature of the invention in this connection lies in the provision of a flexible drive transmission means through which the blades can be driven continuously even though the mower housing may rise and fall or tilt from side to side during operation.

Another object of the invention is to provide a mowing unit of the character described in which the mowing assembly can quickly and easily be disconnected from and reattached to the carriage of the tractor unit.

Still another object is to provide a horizontal whirling blade mower in which by virtue of the disposition of the whirling blades and their housings beneath the tractor the operator is protected from flying fragments of rock or other articles which may be caught up in the blades.

A further object of the invention is to provide a mower which is tractor operated but which is supported at at least one point independently of the tractor and between the front and rear wheels of the tractor so that the effective wheel base of the mower is considerably less than that of the tractor. The shorter mower wheel base makes possible a more accurate following of the ground contours by the cutting blades and results in an evener cut.

Another object is to provide a tractor-type mower in accordance with the foregoing objects which is compact in construction, simple to operate and in which the tractor can serve as a conventional draft vehicle for other purposes when the cutting blades are removed.

Other and further objects together with the features of novelty appurtenant thereto will appear in the course of the following description.

In the accompanying drawings which form a part of the specification and are to be read in conjunction therewith and in which like reference numerals indicate like parts in the various views:

Fig. 4 is a sectional view taken along the line 4—4 of Fig. 1 in the direction of the arrows.

Figure 1:
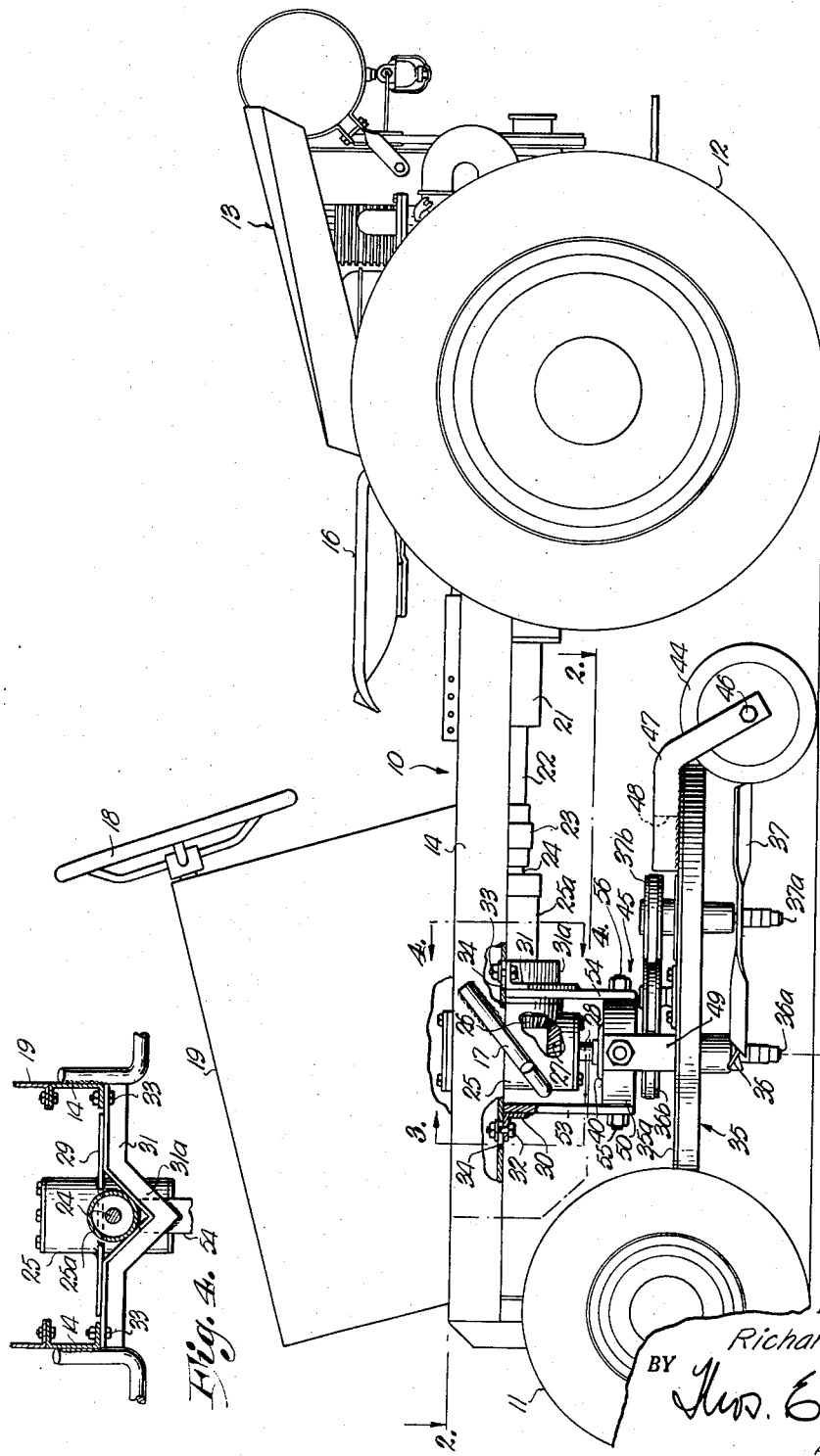
Fig. 1 is a side elevation of a preferred unit embodying my invention with parts broken away and shown in section.

Referring to the drawings, the tractor vehicle for the mowing unit is illustrated in Fig. 1 and comprises a chassis 10 supported at its front end by the spaced front wheels 11 and at the rear by the spaced larger rear wheels 12. The tractor is powered by a conventional internal combustion engine 13 which is drivingly connected with rear wheel 12 in the usual manner. An example of a preferred drive unit and power transmission to the rear wheels is the model L unit manufactured and sold by the Gravely Motor Plow and Cultivator Company, Dunbar, West Virginia.

Figure 2:
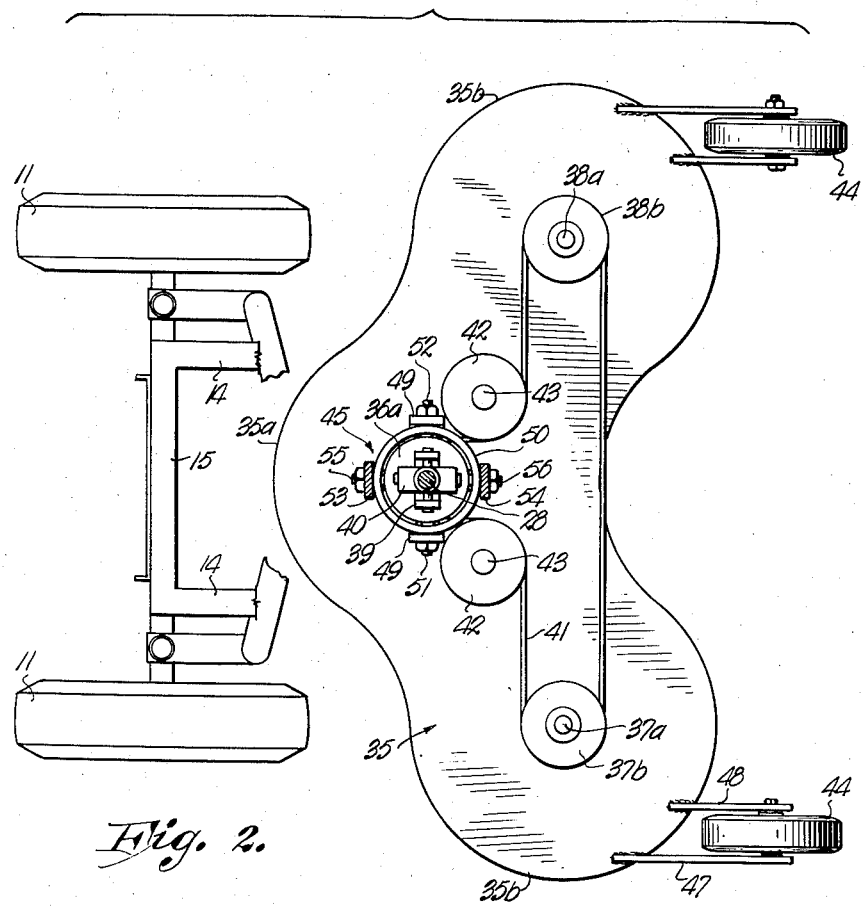
Fig. 2 is a sectional view taken along the line 2—2 of Fig. 1 in the direction of the arrows.

As is best seen in Fig. 2 the chassis preferably is formed of spaced parallel channels 14 connected at each end to one another by cross pieces 15 to provide a rigid rectangular structure. A seat 16 is provided for the operator, and welded to the channels 14 on either side of the chassis are foot rests 17 formed from generally L-shaped pieces of steel rod. A conventional steering system including wheel 18 is connected with the front wheels and to improve the appearance of the tractor a hood member 19 is mounted on the front end.

It will be noted that extending forwardly from engine 13 beneath the seat 16 is a power take-off housing 21. A power take-off shaft 22 extends from this housing and is telescopically coupled through a conventional spline coupling 23 with a second shaft 24 aligned therewith. The second shaft 24 forms the input shaft of a conventional right angle gear box 25 which is supported, in a fashion later to be described, on the tractor. Within box 25 is a first bevel gear 26 connected with shaft 24 and a second gear 27 at right angles thereto which is fixed to a shaft 28 extending downwardly from the lower end of the gear box. The purpose of shaft 28 will be explained at a later point herein.

Figure 3:
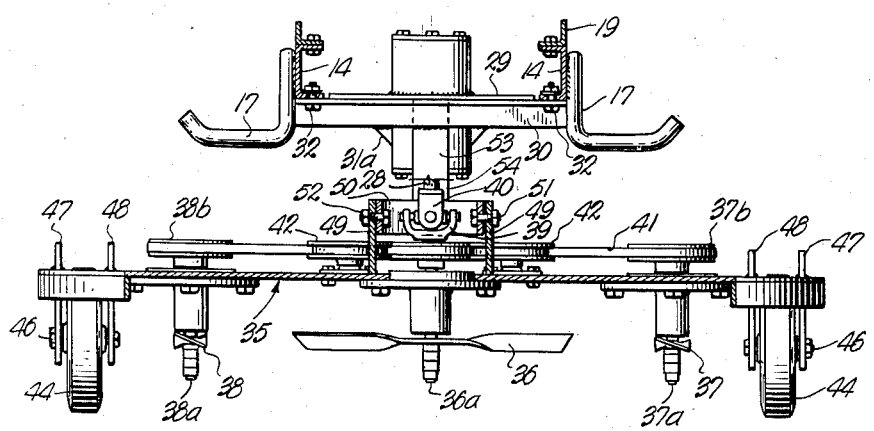
Fig. 3 is a sectional view showing the details of the mower suspension means and taken along the line 3—3 of Fig. 1 in the direction of the arrows.

Referring now to Figs. 3 and 4, the gear box is secured by welding or otherwise in a suitable aperture formed in a horizontal mounting plate 29. The plate 29 is secured to and supported between the channels 14 on cross members 30 and 31, respectively. The forward cross member 30 is conveniently a straight angle member having its opposite ends underlying and bolted to the lower flanges of channels 14 by bolts 32. The rearward cross member 31 likewise extends between the channels 14 and is bolted to the lower flanges thereof by suitable bolts 22. However, cross member 31 is provided with a central V-shaped portion 31a adapted to cradle therein the rearward extension 25a on gear box 25. It will be noted that the bolt holes in the flanges of the channels are preferably elongate slots 34 aligned generally with the major axis of the channel thus permitting fore and aft adjustment of the cross members, mounting plate and gear box through a range limited by the length of the slots. The use of the splined telescopic coupling 23 permits this adjustment without disrupting the drive connection between the shafts 22 and 24.

Located beneath the carriage intermediate the front and rear wheels thereof and supported thereon in a manner later to be described is the mower unit, the main element of which comprises the housing or platform 35. As is perhaps best seen in Fig. 2, housing 35 is, in the preferred embodiment, of a rounded generally V-shape with the apex or nose 35a of the V disposed centrally of the chassis and close upon the axis of front wheels 11. The flanking sections 35b of the housing extend laterally to the opposite sides of the tractor, preferably extending on either side well beyond the outermost points on the rear wheels 12. The flanking sections are semicircular in plan. Rotatably supported in each of the flanking sections and in the nose section are rotary horizontal cutting blades or spinners 36, 37 and 38, respectively.

It will be noted that the length of the mower blades 36, 37 and 38, and the configuration and dimension of the housing 35, are such that the forward blade 36 spans the gap between the side blades 37 and 38. This insures that a complete cut across the width of the mowing unit will be obtained.

Each spinner or blade is supported on a rotary drive shaft 36a, 37a, 38a, respectively, extending through and above the top of housing 35 and rotatably journaled in bearings mounted thereon. Affixed to each blade shaft is a drive pulley 36b, 37b and 38b, respectively. Shaft 36a is somewhat longer than the others and has secured to its upper end one yoke 39 of a conventional universal joint. The other yoke 40 of the universal joint is secured to the downwardly extending shaft 28, which leads from gear box 25 and is connected through the gear box and coupling 23 to the power take-off shaft 22.

The individual pulleys 36b, 37b and 38b are drivingly connected with one another by the single endless belt 41 which is looped partially around pulley 36b. The opposite flights of belt 41 pass around the inside of a pair of guide pulleys 42 to make connection with pulleys 37b and 38b on the opposite flanks of the housing. Guide pulleys 42 are rotatably mounted on upright shafts 43 secured to the top of housing 35 by any suitable means, for example, welding. The location of the guide pulleys relative the blade pulleys preferably is such that belt 41 is required to make contact through at least 180° with each of the blade pulleys, thereby to make certain that sufficient frictional gripping surface will be contacted by the belt to reduce slippage to a minimum.

The housing 35 and its associated spinner structure is supported beneath the carriage in a substantially three point arrangement which includes the two ground engaging wheels 44 and a hanger or suspension means remote from the wheels generally indicated at 45. In the preferred embodiment the wheels 44 are located to the rear of the suspension means 45 and as far out as possible on opposite sides of the housing 35, without, however, extending beyond the outermost points of the housing. Each wheel is mounted on a shaft 46 supported between two parallel bracket plates 47 and 48 which are welded or otherwise rigidly secured to a convenient portion of housing 35, for example, the top.

The hanger or suspension means is located forwardly of the wheels. Secured to the top of housing 35 and spaced laterally from one another are two upwardly extending posts or standards 49. The posts are preferably welded to the housing and are spaced equidistant on opposite sides of the longitudinal center line of the housing outside the spinner pulley 36a. Pivotally connected to the upper ends of posts 49 and located therebetween is a circular ring member 50 which extends around the universal joint between shafts 28 and 36a. Bolts 51 and 52 form the pivotal connection, each passing through suitable apertures in the respective post 49 and the adjacent portions of the ring. The bolts are aligned with one another on a diameter of the ring and are so located above the housing as to provide a pivot axis which passes through the center of the universal joint formed by yokes 39 and 40.

The ring 50 is in turn suspended from the carriage by means of a pair of spaced hanger arms 53 and 54 which in the preferred embodiment are located centrally between the chassis channels 14 and on a line substantially at right angles to a line drawn between the housing posts 49. The upper end of the forward arm 53 is secured to the forward cross member 30, preferably by welding, and the upper end of the rearward arm 54 is welded or otherwise secured to the central V-section 31a of the rear cross member 31. The ring is pivotally secured between the hangers 53 and 54 by means of bolts 55 and 56 aligned with one on a diameter of the ring and which forms a pivot axis normal to the axis of bolts 51 and 52. This axis also is so located as to intersect the center of the universal joint and consequently it intersects at right angles the axis of bolts 51 and 52.

From the foregoing it will be evident that the suspension connection between the tractor and mower in effect forms a gimbal joint which permits free inclination of the mower housing 35 in any direction relative to the tractor. The housing is free to pivot about an axis formed by the bolts 51 and 52 and this axis is in turn freely pivotal about a second axis at right angles thereto defined by bolts 55 and 56. The providing of a universal joint on the drive shaft 28 whose center coincides with the intersection of the two suspension axes makes possible a continuous drive to the mower blades despite changes in inclination of the housing 35 relative the tractor.

The operation of my invention is believed clear from the foregoing description. As the mower travels over the terrain the mowing blades or spinners 36, 37 and 38 are rotated at high speed through power take-off shaft 22, coupling 23, input shaft 24, the shaft 28 depending from gear box 25, belt 41 and the blade pulleys 36b, 37b and 38b. The grass is engaged by the blades as the mower advances and is severed in the conventional fashion. The overlap of blade 36 with respect to blades 37 and 38 insures that no uncut strips occur in the area spanned by the housing 35 as the unit proceeds.

The unit finds particular advantage in operating over rough and uneven terrain. The hinged connection of the housing 35 with the tractor for movement about two axes, one represented by bolts 51 and 52 and transverse to the normal path of travel and the other represented by bolts 55 and 56 aligned with the path of travel assures that as the supporting wheels 44 pass over ridges or through gulleys in the ground surface the mower housing will move independently of the tractor to follow the ground contour. The gimbal joint suspension means afforded by the two intersecting axes hereinbefore mentioned permits the mower to assume any inclination relative the tractor necessary to maintain the blades spaced at the proper spacing above the ground. Ridges and gulleys transverse to the line of travel, or crowns or inclines over which the tractor proceeds, will not cause the blades to dig in or cause undue strain on the suspension means since the housing 35 can rise and fall relative the tractor responsive to the upward or downward displacement of wheels 44. Side inclines are also compensated for, the pivotal connection of the housing with the tractor through bolts 55 and 56 permitting tilting movement in either direction about an axis normal to the line of advance.

The movement about each of the suspension axes can be simultaneous or one can take place independent of the existence of the other. The center of gravity of the housing and spinner assembly is of course offset laterally from a vertical line through the intersection point of the two axes so that the wheels 44 remain in contact with the ground at all times. Regardless of the inclination at any time of the housing, the drive connection from the engine to the mower blades remains unaffected due to the provision of the universal joint.

The formation of the apex of housing 35 as a nose section 35a adapted to be disposed close to the front wheel axle line makes possible the provision of a mower unit in which scalping of the ground or digging in of the blades is held to a minimum. The close proximity of the nose section 35a and suspension means to the front wheel axis insures that the forward portion of the housing will be displaced a distance almost equal to the rise or fall of the front wheels 11 as the mower passes through a gulley or over a ridge. The mower housing wheels 44, being considerably closer to the front tractor wheels than are the rear tractor wheels, cause the housing to rise and fall ahead of the rear tractor wheels and no reliance whatever is placed on the latter to keep the mower at the proper level. Accordingly, it is possible to obtain a more uniform and much closer cut than should the mower housing be mounted rigid on the chassis.

Cutting under the overhanging branches of hedge rows or closely adjacent walls and trees is facilitated by the extension of the housing 35 and blades 37 and 38 laterally beyond the outermost points on the rear wheels 12. As is believed evident the outer edge of the housing can be brought closely adjacent a wall or tree without interference from the tractor wheel; and the outer portion or flanks of the housing can be introduced beneath the low lying limbs on short trees and shrubs. During cutting, the operator is located well above flying rocks or other articles which might be picked up and thrown out by the blades but not intercepted by the top and rear depending flange of housing 35.

Should it be desired to use the tractor for other purposes, the mower housing 35 and its associated mechanism can be quickly and easily removed through the simple expedient of withdrawing bolts 55 and 56 from the hanger arms 53 and 54. The universal joint can then be separated by withdrawing the conventional cross pin. Alternatively, the entire unit including gear box 25 can be separated from the tractor by disengaging the four bolts 32 and 33 from the channels 14 and withdrawing shaft 24 from the spline coupling 23.

From the foregoing it will be seen that my invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a power operated mower of the character described a carriage including a chassis, front and rear wheels supporting said chassis, power drive means mounted on said chassis and connected with at least one of said wheels for propelling said carriage, a power take-off on said power drive means, a normally substantially horizontal mower housing positioned beneath said chassis between said front and rear wheels, at least one horizontal rotary cutting blade mounted within said housing, suspension means connecting said housing to said chassis and mounting said housing for simultaneous pivotal movement relative said chassis about two intersecting substantially horizontal axes at right angles with one another, ground engaging means carried by said housing and supporting said housing at points remote from the intersection of said axes whereby to follow the ground contours and cause movement of said housing about said axes as said carriage advances, and a flexible drive connection between said power take-off and said blade.

2. Apparatus as in claim 1 wherein said drive connection includes a blade shaft extending through and above said housing, a power drive shaft connected with said power take-off and extending toward said blade shaft, and a universal joint connecting said shafts, the axes of said universal joint intersecting at the point of intersection of said horizontal axes.

3. Apparatus as in claim 1 wherein said ground engaging means comprises a pair of outrigger wheels connected with said housing to the rear of said suspension means, the distance of said outrigger wheels from said front wheels being less than that from the front to the rear wheels.

4. In a mower of the character described, a carriage including a chassis, front and rear wheels supporting said chassis, a mower housing positioned beneath said chassis between said front and rear wheels, suspension means connecting said housing with and supporting it beneath said chassis, said means including a gimbal joint whereby said housing can be tilted in any direction relative said chassis, and ground engaging means on the housing remote from the gimbal joint and adapted to follow the ground contours to cause inclination of said housing relative the carriage responsive to the ground contours as the carriage advances.

5. In a mower of the character described, a carriage including a chassis, front and rear wheels supporting said chassis, a pair of spaced hanger arms depending beneath said chassis, a gimbal member pivotally secured between said arms about a first axis, a generally horizontal mower housing positioned beneath said chassis between said front and rear wheels, means pivotally connecting said housing with said gimbal member about a second axis transverse to said first axis, ground engaging means supporting said housing at points remote from said gimbal member whereby as said carriage advances said housing is shifted about said axes responsive to the following of the ground contours by said ground engaging means.

6. In a power mower of the character described, a carriage including a chassis, front and rear wheels supporting said chassis, power drive means mounted on said chassis and connected with at least one of said wheels for propelling the carriage, a power take-off connected with said drive means including a rotary shaft, extending vertically below said carriage between said front and rear wheels, a normally horizontal mower housing positioned between said front and rear wheels beneath said chassis, suspension means for connecting said housing with said carriage and supporting a portion thereof at a predetermined spacing above the ground, said means including a gimbal joint concentric with said shaft and having two axes normal to one another and intersecting on the axis of said shaft, at least one spinner mower blade supported within said housing, a second vertical shaft connected with said blade and extending toward the intersection of said axes, a universal joint joining said shafts, the center of said universal joint coinciding with the gimbal joint axes, and ground engaging means supporting said housing at points remote from said gimbal point and adapted to incline said housing responsive to changes in ground contours as said mower advances to maintain the cutting blade at the proper spacing from the ground.

7. In a power mower of the character described, a carriage including a chassis, front and rear wheels supporting said chassis, power drive means mounted on said chassis and connected with at least one of said wheels for propelling said carriage, a power take-off connected with said drive means including a rotary shaft extending vertically below said carriage between said front and rear wheels, a normally horizontal mower housing positioned beneath said carriage between said front and rear wheels, said housing being symmetrical in plan and including a rounded forwardly extending nose section trailed on each side into the rear thereof by side sections extending outwardly beyond said wheels, suspension means connecting said housing to said carriage and including a gimbal joint permitting inclination of said housing in any direction relative said carriage, outrigger wheels on the opposite sides of said housing and remote from said gimbal joint, the distance of said outrigger wheels from said front wheels being less than that from the front of the rear wheels, spinner mower blades supported in each of said sections of said housing, and power transmission means drivingly connecting said shaft with said blades, said transmission means being constructed and arranged to provide a continuous drive despite varying inclinations of said housing.

8. Apparatus as in claim 7 wherein said transmission means includes a single flexible and continuous belt connecting the mower blades for simultaneous rotation.

9. In a power mower of the character described, a carriage including a chassis, a power source rigidly mounted on said chassis, a power take-off on said power source, a normally substantially horizontal mower housing positioned beneath said chassis, at least one horizontal rotary cutting blade mounted within said housing, means connected with said chassis and suspending said housing for simultaneous movement relative said chassis about a first horizontal axis aligned substantially with the normal path of advance of the carriage and a second horizontal axis substantially at right angles to said first axis, ground engaging means connected with said housing and arranged to provide ground support for said housing at points remote from both said axes whereby said housing is tilted relative said chassis and about said axes in accordance with changing ground contour as the carriage is advanced, and a flexible drive connection between said power take-off and said blade operable to maintain continuous rotation of said blade despite tilting of said housing relative said chassis.

10. In a power operated mower of the character described: a chassis including a frame and front and rear wheels supporting said frame; power drive means mounted on said chassis and connected with at least one of said wheels for propelling said chassis; a power take-off on said power drive means; a normally substantially horizontal mower housing positioned beneath said frame between said front and rear wheels; at least one horizontal rotary cutting blade mounted within said housing; suspension means connecting said housing with said chassis and mounting said housing for rocking movement relative to said frame about each of two substantially horizontal axes one of which is disposed longitudinally of the chassis and the other of which is disposed transversely of the chassis; ground-engaging means connected with said housing and supporting said housing at points remote from said horizontal axes, whereby to follow the ground contours and cause rocking movement of said housing about said horizontal axes as said chassis advances; and a flexible drive connection between said power take-off and said blade.

References Cited in the file of this patent

UNITED STATES PATENTS

| | | |
|---|---|---|
| 464,231 | Robinson | Dec. 1, 1891 |
| 1,672,588 | Turnidge | June 5, 1928 |
| 2,090,891 | Kuns | Aug. 24, 1937 |
| 2,638,353 | Danielson et al. | May 12, 1953 |
| 2,656,194 | Saulsbury | Oct. 20, 1953 |
| 2,711,624 | Crump | June 28, 1955 |
| 2,723,518 | Carlson | Nov. 15, 1955 |
| 2,763,977 | Spencer, et al. | Sept. 25, 1956 |